United States Patent
Michael et al.

(10) Patent No.: US 9,250,980 B2
(45) Date of Patent: Feb. 2, 2016

(54) SYSTEM, METHOD, PROGRAM, AND CODE GENERATION UNIT

(75) Inventors: Maged M. Michael, Danbury, CT (US); Takuya Nakaike, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 520 days.

(21) Appl. No.: 12/969,683

(22) Filed: Dec. 16, 2010

(65) Prior Publication Data

US 2011/0154343 A1 Jun. 23, 2011

(30) Foreign Application Priority Data

Dec. 18, 2009 (JP) ................... 2009-288102

(51) Int. Cl.
*G06F 9/46* (2006.01)
*G06F 9/52* (2006.01)

(52) U.S. Cl.
CPC ..................... *G06F 9/528* (2013.01)

(58) Field of Classification Search
None
See application file for complete search history.

(56) References Cited

U.S. PATENT DOCUMENTS

| | | | |
|---|---|---|---|
| 2003/0079094 A1* | 4/2003 | Rajwar et al. | 711/150 |
| 2010/0115502 A1* | 5/2010 | Jiva et al. | 717/148 |
| 2011/0239219 A1* | 9/2011 | Fulton et al. | 718/103 |

FOREIGN PATENT DOCUMENTS

| | | |
|---|---|---|
| JP | 2-067670 A | 3/1990 |
| JP | 5-257792 A | 10/1993 |
| JP | 2001-236221 | 8/2001 |
| JP | 2003-519874 | 6/2003 |
| JP | 3646137 B2 | 5/2005 |
| JP | 2005-182594 | 7/2005 |
| JP | 2006-185232 A | 7/2006 |
| JP | 2007-249634 | 9/2007 |
| JP | 2008-501199 A | 1/2008 |
| JP | 2008-257594 | 10/2008 |
| JP | 4180569 B2 | 11/2008 |
| JP | 2009-508187 | 2/2009 |

OTHER PUBLICATIONS

A Runtime System for Software Lock Elision, Harris et al., 2009.*
Seqlock, Online Wikipedia (Search of "Seqlock" on Dec. 2, 2009), http://en.wikipedia.org/wiki/Seqlock.

* cited by examiner

*Primary Examiner* — Mengyao Zhe
(74) *Attorney, Agent, or Firm* — Tutunjian & Bitetto, P.C.; Jennifer R. Davis

(57) ABSTRACT

A system for parallel processing tasks by allocating the use of exclusive locks to process critical sections of a task. The system includes storing update information that is updated in response to acquisition and release of an exclusive lock. When processing a task which includes a critical section containing code affecting execution of the other task, an exclusive execution unit acquires an exclusive lock prior to processing the critical section. When the section has been processed successfully, the lock is released and update information updated. Meanwhile a second task, whose critical section does not contain code affecting execution of the other task may run in parallel, without acquiring an exclusive lock, via a nonexclusive execution unit. The nonexclusive execution unit determines that the second critical section has successfully completed if the update information has not changed during processing of the second critical section.

17 Claims, 15 Drawing Sheets

FIG. 9

```
public class ReentrantSoleroLock {
    AtomicLong counter;
    long        recursionCounter;
};
```

FIG. 13

```
1:  while(true){
2:      v=lock.counter.get();
3:      if(isLocked(v)){
4:          wait();
5:      }else{
6:          if(lock.counter.compareAndSwap(v,THREAD_ID|1)){
7:              break;
8:          }
9:      }
10: }
11: X=1;
12: Y=1;
13: lock.counter.set(v+2);
```

FIG. 14

```
1:  while(true){
2:    while(true){
3:      v=lock.counter.get();
4:      if(isLocked(v)){
5:        wait();
6:      }else{
7:        break;
8:      }
9:    }
10:   v1=X;
11:   v2=Y;
12:   if(v==lock.counter.get())}
13:     break;
14:  }
15: }
```

SYSTEM, METHOD, PROGRAM, AND CODE GENERATION UNIT

CROSS-REFERENCE TO RELATED APPLICATIONS

This application claims priority under 35 U.S.C. §119 to Japanese Patent Application No. 2009-288102 filed Dec. 18, 2009, the entire contents of which are incorporated herein by reference.

BACKGROUND OF THE INVENTION

1. Field of the Invention

The present invention generally relates to a computer system, a method, a program, and a code generation unit for executing multithreaded parallel processing. More particularly the present invention relates to allocating the use of exclusive locks to process critical sections of a task.

2. Description of the Related Art

In computer systems, multi-threaded systems in which multiple threads perform processing in parallel are known. In a multi-threaded system, when each thread accesses, for example, a shared variable, the thread synchronizes with the other threads. A general synchronization method in multi-threading includes using an exclusive lock to control access.

When a thread acquires an exclusive lock, an atomic instruction such as compare-and-swap needs to be executed. The execution cost of an atomic instruction is higher than those of the other types of instructions. Thus, when an exclusive lock is acquired, the cost of overall processing increases.

Moreover, when an exclusive lock is acquired and released, writing on a lock variable occurs. Thus, when an exclusive lock is frequently acquired and released, cache coherent traffic increases.

A method called sequential lock is known as a method for solving such problems ("Seqlock", online, WIKIPEDIA, searched Dec. 2, 2009, http://en.wikipedia.org/wiki/Seqlock). A sequential lock is a type of reader/writer lock, and a lock variable is implemented as a counter. When the counter indicates an odd number, this shows that the lock has been acquired. When the counter indicates an even number, this shows that the lock has been released. Every time the lock is acquired and released, the counter is incremented by one.

In a system in which a sequential lock is used, when a thread performs processing in a critical section involving writing, the thread acquires the lock. When a thread performs processing in a critical section not involving writing, the thread performs the following processing.

At the beginning of the critical section, the thread first reads the counter value (lock variable). Subsequently, the thread performs the processing in the critical section. Subsequently, at the end of the critical section, the thread reads the counter value and compares the counter value with that read at the beginning of the critical section. When the values are the same, the thread completes the processing in the critical section. When the values are different, the thread repeats the processing in the critical section from the beginning.

In this manner, in a system in which a sequential lock is used, when processing in a critical section not involving writing is performed, no atomic instruction is executed, and thus the execution cost can be reduced. Moreover, in a system in which a sequential lock is used, since the number of write operations on a lock variable can be reduced, cache coherent traffic can be reduced.

In a known system in which a sequential lock is used, one thread has been incapable of continuously acquiring the same exclusive lock. Thus, in a known system in which a sequential lock is used, in general, performance of processing in a nested critical section, i.e., processing in another critical section inside one critical section, has been prohibited.

Moreover, in a known system in which a sequential lock is used, while processing in a critical section not involving writing is being performed, when processing in another critical section involving writing is performed, the processing in the critical section not involving writing fails. Thus, when processing in a critical section involving writing is frequently performed, processing in a critical section not involving writing and being performed in parallel is not completed for a long time.

Moreover, in a known system in which a sequential lock is used, while a loop process included in a critical section not involving writing is being performed, a thread that is performing processing in another critical section involving writing may rewrite a variable related to a condition for terminating the loop process. In such a case, the loop process included in the critical section not involving writing is not completed.

Moreover, in a known system in which a sequential lock is used, a critical section not involving writing may contain a pointer for specifying a reference from which data is read. In this case, while the processing in the critical section not involving writing is being performed, when another thread writes NULL to the reference of the pointer, the critical section not involving writing accesses NULL and thus stops performance of the processing.

Moreover, in a known system in which a sequential lock is used, a critical section may include a write instruction that is seldom executed. For example, a write instruction included in an IF statement may be seldom executed. However, in a known system in which a sequential lock is used, even in the case of such a critical section including only a write instruction that is seldom executed, the processing needs to be performed by acquiring an exclusive lock.

SUMMARY OF THE INVENTION

In one aspect, the present invention provides a system, a method, a program, and a code generation unit. The system performs exclusive control among tasks and includes a lock status storage unit storing update information that is updated in response to acquisition and release of an exclusive lock by one task and task identification information for identifying a task that has acquired an exclusive lock, an exclusive execution unit causing processing in a critical section included in a first task to be performed by acquiring an exclusive lock, the exclusive execution unit releasing an exclusive lock and updating the update information after the processing in the critical section included in the first task, and a nonexclusive execution unit causing processing in a critical section included in a second task to be performed without acquiring an exclusive lock, the nonexclusive execution unit determining, on the condition that the update information has not changed over the processing in the critical section included in the second task, that the processing in the corresponding critical section has been successfully completed.

In another aspect, the present invention provides a system, a method, a program, and a code generation unit. The system includes a lock status storage unit, an exclusive unit and a nonexclusive unit. The non-exclusive unit can acquire an exclusive lock if the processing in the critical section by the second task has not been successfully completed when a predetermined condition has been reached. the nonexclusive execution unit acquires the exclusive lock and causes the processing in the critical section included in the second task to be performed.

In yet another aspect, the present invention provides a method for performing exclusive control among tasks. The method includes a storing update information on a lock status storage unit. The update information is updated in response to the acquisition and release of an exclusive lock by one task. The method also includes storing task identification information for identifying a task that has acquired an exclusive lock. A further step in the method includes acquiring an exclusive lock by an exclusive execution unit and then processing in a critical section included in a first task. Upon completion of the processing of the critical section in the first task, the exclusive execution unit releases the exclusive lock and updates the update information. Finally, a critical section included in a second task is processed without acquiring an exclusive lock. A nonexclusive execution unit determines that the critical section of the second task has successfully completed, if the update information has not changed over the processing in the critical section included in the second task.

It should be noted that the aforementioned outline of the invention does not include all necessary features of the present invention, and a sub-combination of these features may also constitute the invention.

BRIEF DESCRIPTION OF DRAWINGS

FIG. 9 shows exemplary code described in Java (registered trademark), the code causing a memory to function as a lock status storage unit 26.

FIG. 13 shows an exemplary critical section involving writing.

FIG. 14 shows an exemplary critical section not involving writing.

DETAILED DESCRIPTION OF THE PREFERRED EMBODIMENTS

The present invention will now be described via the preferred embodiments. However, the present invention should not be viewed as being limited thereto.

Figure 1:
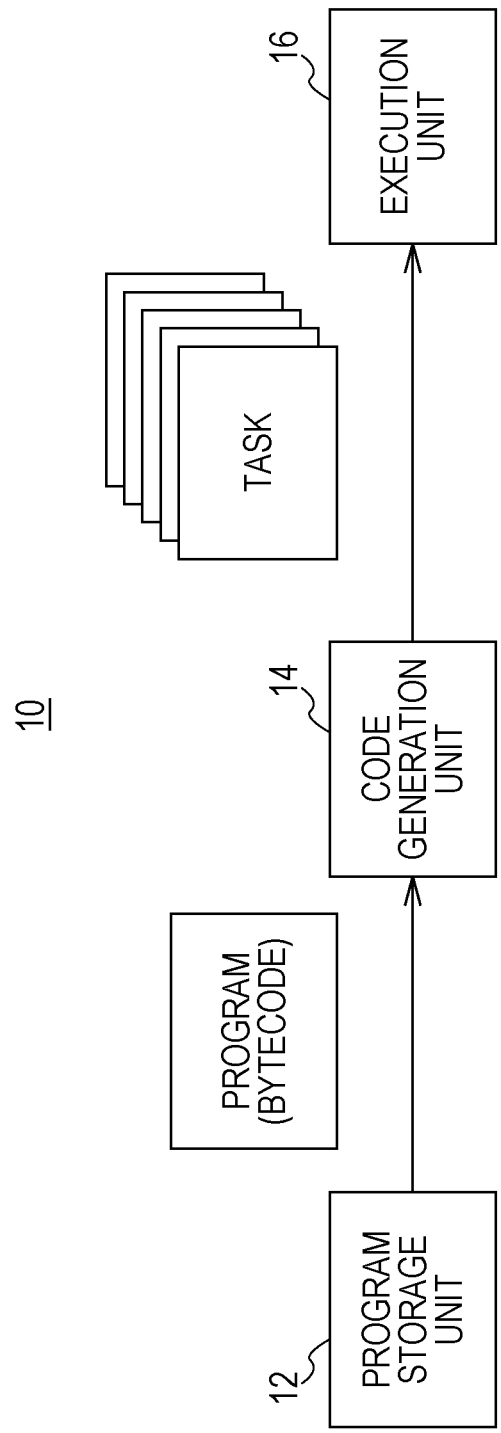
FIG. 1 shows the functional components of a computer system 10 according to an embodiment of the present invention.

FIG. 1 shows the functional components of a computer system 10 according to the embodiment. The computer system 10 includes a program storage unit 12, a code generation unit 14, and an execution unit 16.

The program storage unit 12 stores programs. For example, a program stored in the program storage unit 12 may be Java (registered trademark) bytecode. The program storage unit 12 is implemented via a storage unit such as a memory and a hard disk.

The code generation unit 14 converts a program stored in the program storage unit 12 to code in a format that can be executed by the execution unit 16. For example, the code generation unit 14 may be a Just-In-Time (JIT) compiler that dynamically compiles, at run time, bytecode to code that can be executed by the execution unit 16. The code generation unit 14 is implemented by a Central Processing Unit (CPU) executing a compiler program.

The execution unit 16 executes the code converted by the code generation unit 14. The execution unit 16 is implemented by the CPU executing an operating system.

Moreover, the execution unit 16 executes multiple tasks in parallel. In the execution unit 16, for example, each unit (for example, a thread or a process) of division processing of the CPU executes a task. Moreover, multiple tasks executed by the execution unit 16 can access, for example, a variable, an array, and a storage area that are shared.

Moreover, each task may contain a critical section. A critical section is a part that needs to be executed excluding the other tasks. That is, a critical section is a part in which consistency of processing cannot be ensured when multiple tasks execute the part at the same time.

In this case, regarding a critical section containing code affecting execution of the other tasks (for example, an instruction to write to a shared variable shared among tasks or an instruction to call a function containing an instruction to write to a shared variable), out of critical sections included in a task, the execution unit 16 performs reliable processing for which an exclusive lock is acquired.

In contrast, regarding a critical section not containing code affecting execution of the other tasks, out of critical sections included in a task, the execution unit 16 performs optimistic processing for which acquisition of an exclusive lock is omitted. Moreover, even in the case of a critical section in which code affecting execution of the other tasks resides in a loop, and the code is seldom executed, the execution unit 16 may perform optimistic processing for which acquisition of an exclusive lock is omitted. The details of specific processing by the execution unit 16 will be described below.

Figure 2:
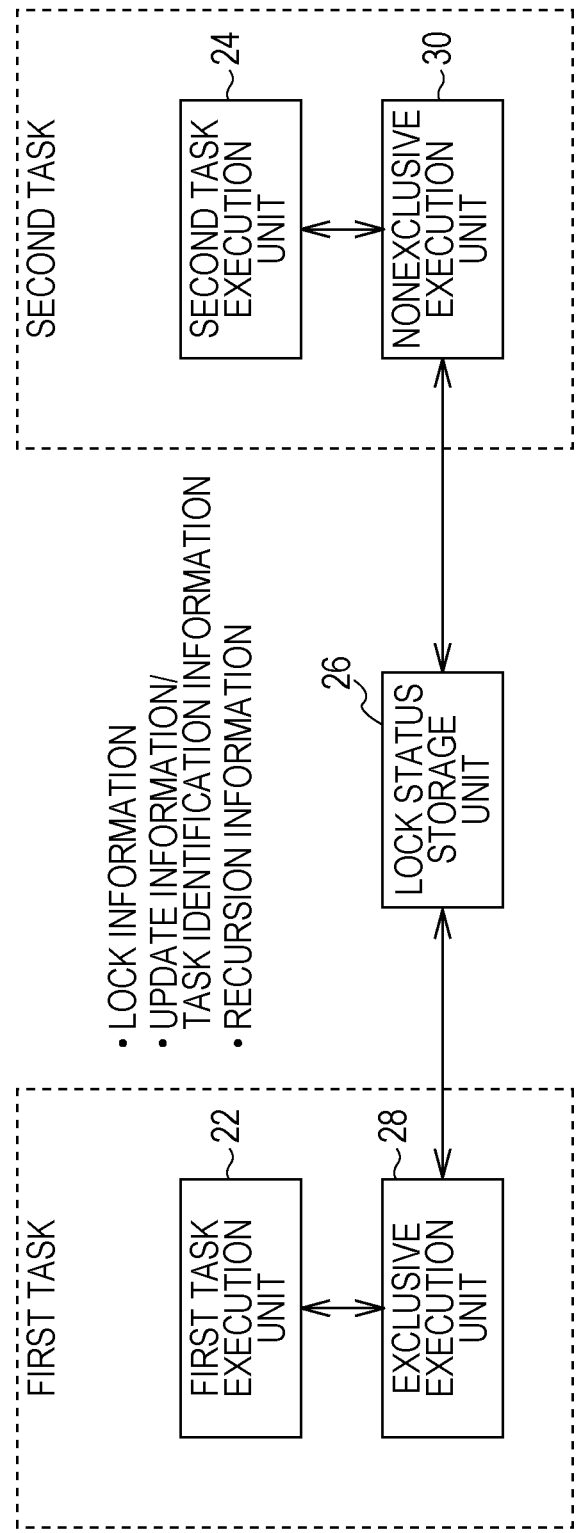
FIG. 2 shows the functional components of the computer system 10 in a case where a first task and a second task are executed in parallel.

FIG. 2 shows the functional components of the computer system 10 in a case where a first task and a second task are executed in parallel. The first task includes a critical section containing code affecting execution of the other task (for example, an instruction to write to a shared variable and an instruction to call a function containing an instruction to write to a shared variable). Moreover, the second task includes a critical section not containing code affecting execution of the other task.

When multiple tasks are executed in parallel, the computer system 10 performs exclusive control among tasks. In a case where the computer system 10 performs exclusive control between the first task and the second task, the computer system 10 functions as a device that includes functional blocks shown in FIG. 2. That is, in a case where the computer system 10 performs exclusive control between the first task and the second task, the computer system 10 includes a first task execution unit 22, a second task execution unit 24, a lock status storage unit 26, an exclusive execution unit 28, and a nonexclusive execution unit 30.

The first task execution unit 22 performs processing of the first task. The first task execution unit 22 is implemented by, for example, a first unit (for example, a thread or a process) of processing of the CPU, the first unit executing the execution code of the first task.

The second task execution unit 24 performs processing of the second task. The second task execution unit 24 is implemented by, for example, a second unit of processing of the CPU other than the first unit of processing, the second unit executing the execution code of the second task.

The lock status storage unit 26 is implemented on a memory accessed by the CPU. The lock status storage unit 26 stores lock information indicating whether any task has acquired an exclusive lock or all the tasks have released an exclusive lock. Lock information is, for example, a bit of data. When the value of lock information is one, this shows that one task has acquired an exclusive lock. When the value of lock information is zero, this shows that all the tasks have released an exclusive lock.

Moreover, the lock status storage unit 26 stores update information that is updated in response to acquisition and release of an exclusive lock by one task and task identification information for identifying a task that has acquired an exclusive lock. Update information is, for example, a counter value that is incremented. Task identification information is a value assigned uniquely to each task.

For example, the lock status storage unit 26 includes a storage area for storing task identification information when one task has acquired an exclusive lock and storing update information when all the tasks have released an exclusive lock. That is, the lock status storage unit 26 includes a storage area to which task identification information is written when an exclusive lock has been acquired and to which update information is written when an exclusive lock has been released.

Moreover, the lock status storage unit 26 stores recursion information indicating the number of repetitions of acquisition of an exclusive lock by the same task. For example, zero is set as the initial value of the number of repetitions. In a state in which one task has acquired an exclusive lock, when the one task further acquires an exclusive lock, one is added to the number of repetitions. In a state in which the value of the number of repetitions is one or more, when the one task releases an exclusive lock, one is subtracted from the number of repetitions.

The exclusive execution unit 28 controls execution of a critical section included in the first task (i.e., a critical section containing code affecting execution of the other task). Specifically, the exclusive execution unit 28 acquires an exclusive lock and causes processing in the critical section included in the first task to be performed. After the processing in the critical section included in the first task, the exclusive execution unit 28 releases the exclusive lock and updates update information. Specific content of processing by the exclusive execution unit 28 will be further described below, referring to flows shown in FIGS. 3 and 4.

The nonexclusive execution unit 30 controls execution of a critical section included in the second task (i.e., a critical section not containing code affecting execution of the other task). Specifically, the nonexclusive execution unit 30 causes processing in the critical section included in the second task to be performed without acquiring an exclusive lock. Then, on the condition that update information does not change over the processing in the critical section included in the second task, the nonexclusive execution unit 30 determines that the processing in the critical section has been successfully completed. Specific content of processing by the nonexclusive execution unit 30 will be further described below, referring to flows shown in FIGS. 5 to 8.

In this case, control code for performing exclusive control of a critical section is generated by the code generation unit 14 in compilation of a task including the critical section. The exclusive execution unit 28 and the nonexclusive execution unit 30 are implemented by the CPU executing such execution code.

The computer system 10 including the aforementioned components is implemented by the CPU executing execution code generated by the code generation unit 14. The code generation unit 14 dynamically converts bytecode to execution code during execution of applications. More specifically, every time a task is activated, the code generation unit 14 generates execution code for causing the CPU to function as the computer system 10 including the components shown in FIG. 2.

Figure 3:
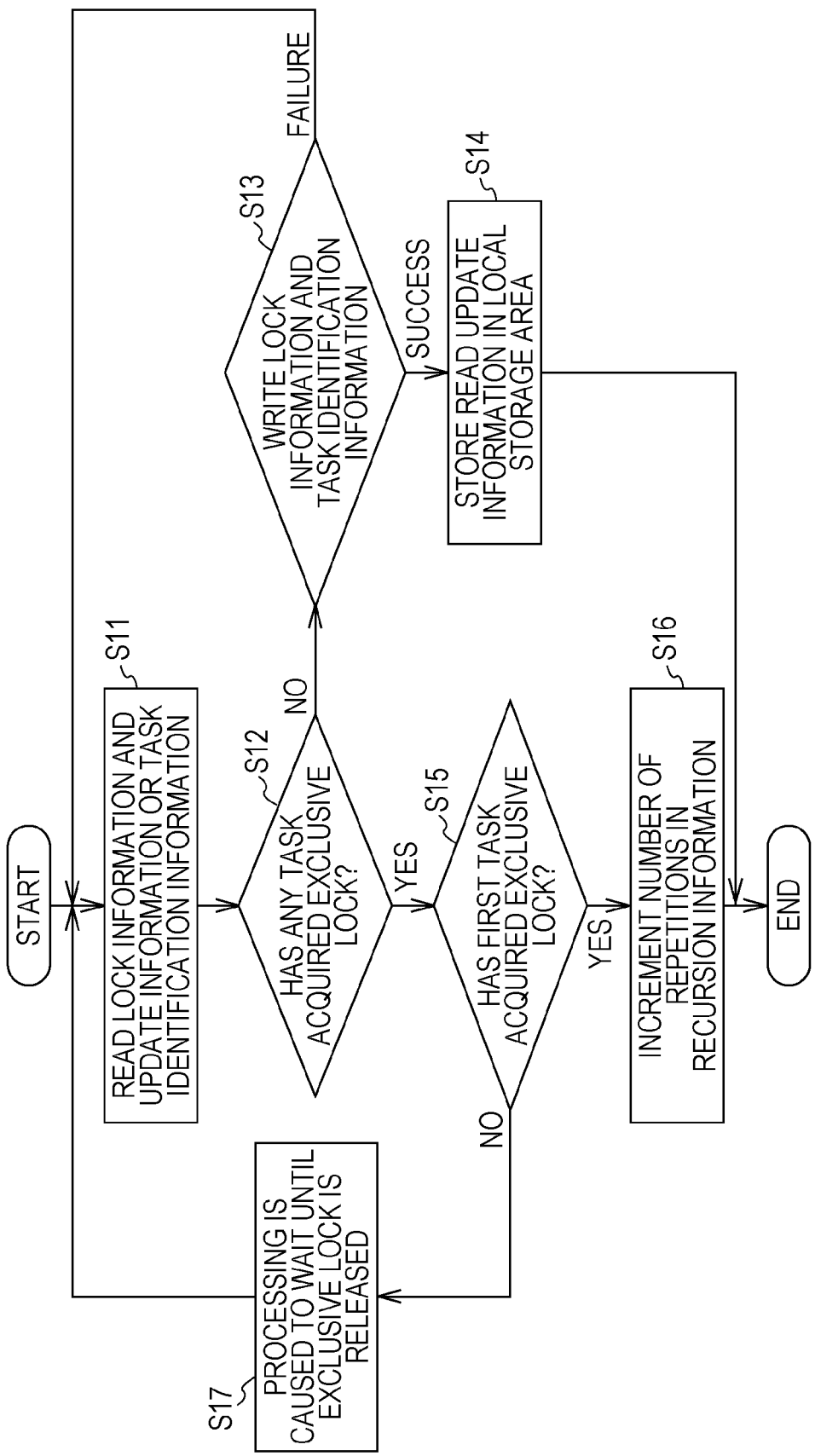
FIG. 3 shows a process flow of acquisition of an exclusive lock by an exclusive execution unit 28 according to an embodiment of the present invention.

FIG. 3 shows a process flow of acquisition of an exclusive lock by the exclusive execution unit 28 according to the embodiment. The exclusive execution unit 28 acquires an exclusive lock before performing processing in a critical section included in the first task. When the exclusive execution unit 28 acquires an exclusive lock, the exclusive execution unit 28 performs operations in steps S11 to S17 in FIG. 3.

In step S11, the exclusive execution unit 28 first reads lock information from the lock status storage unit 26. In step S11, the exclusive execution unit 28 further reads update information or task identification information from a predetermined storage area of the lock status storage unit 26. In this case, when all the tasks have released an exclusive lock, the exclusive execution unit 28 reads update information from the lock status storage unit 26. When one task has acquired an exclusive lock, the exclusive execution unit 28 reads task identification information.

Subsequently, in step S12, the exclusive execution unit 28 determines whether any task has acquired an exclusive lock, referring to the read lock information. As a result of the determination in step S12, when no task has acquired an exclusive lock, i.e., when all the tasks have released an exclusive lock (No in S12), the exclusive execution unit 28 causes the process to proceed to step S13. In step S13, the exclusive execution unit 28 writes, to the lock status storage unit 26, lock information indicating that an exclusive lock has been acquired and writes, to the lock status storage unit 26, task identification information for identifying the first task instead of update information.

In this case, in step S13, the exclusive execution unit 28 atomically writes the lock information and the task identification information to the lock status storage unit 26. When the exclusive execution unit 28 has failed to write the lock information and the task identification information (failure in S13), the exclusive execution unit 28 causes the process to return to step S11 and repeats the process from reading of lock information and the like. When the exclusive execution unit 28 has successfully written the lock information and the task identification information (success in S13), the exclusive execution unit 28 causes the process to proceed to step S14.

Subsequently, in step S14, the exclusive execution unit 28 stores the update information read in step S11 in a local storage area. After the exclusive execution unit 28 completes the operation in step S14, the exclusive execution unit 28 completes acquisition of an exclusive lock and causes the first task execution unit 22 to perform the processing in the critical section in the first task.

Moreover, as a result of the determination in step S12, when one task has acquired an exclusive lock (Yes in S12), the exclusive execution unit 28 causes the process to proceed to step S15. In step S15, the exclusive execution unit 28 determines whether the first task has acquired an exclusive lock, referring to the read task identification information. For example, the exclusive execution unit 28 determines whether the read task identification information matches the identification information of the first task.

As a result of the determination in step S15, when the first task has acquired an exclusive lock, i.e., when the read task identification information matches the identification information of the first task (Yes in S15), the exclusive execution unit 28 causes the process to proceed to step S16. In step S16, the exclusive execution unit 28 increments the number of repetitions in recursion information stored in the lock status storage unit 26. After the exclusive execution unit 28 completes the operation in step S16, the exclusive execution unit 28 completes acquisition of an exclusive lock and causes the first task execution unit 22 to perform the processing in the critical section in the first task.

Moreover, as a result of the determination in step S15, when the exclusive execution unit 28 determines that the first task has not acquired an exclusive lock (No in S15), the exclusive execution unit 28 causes the process to proceed to step S17. In step S17, the exclusive execution unit 28 causes the process to wait until an exclusive lock is released. When an exclusive lock is released, the exclusive execution unit 28 causes the process to return to step S11 and repeats the process from reading of lock information and the like.

In the aforementioned process, the exclusive execution unit 28 can acquire an exclusive lock before performing the processing in the critical section in the first task. Thus, the exclusive execution unit 28 can perform the processing in the critical section included in the first task without causing inconsistency between the first task and the other task.

Figure 4:
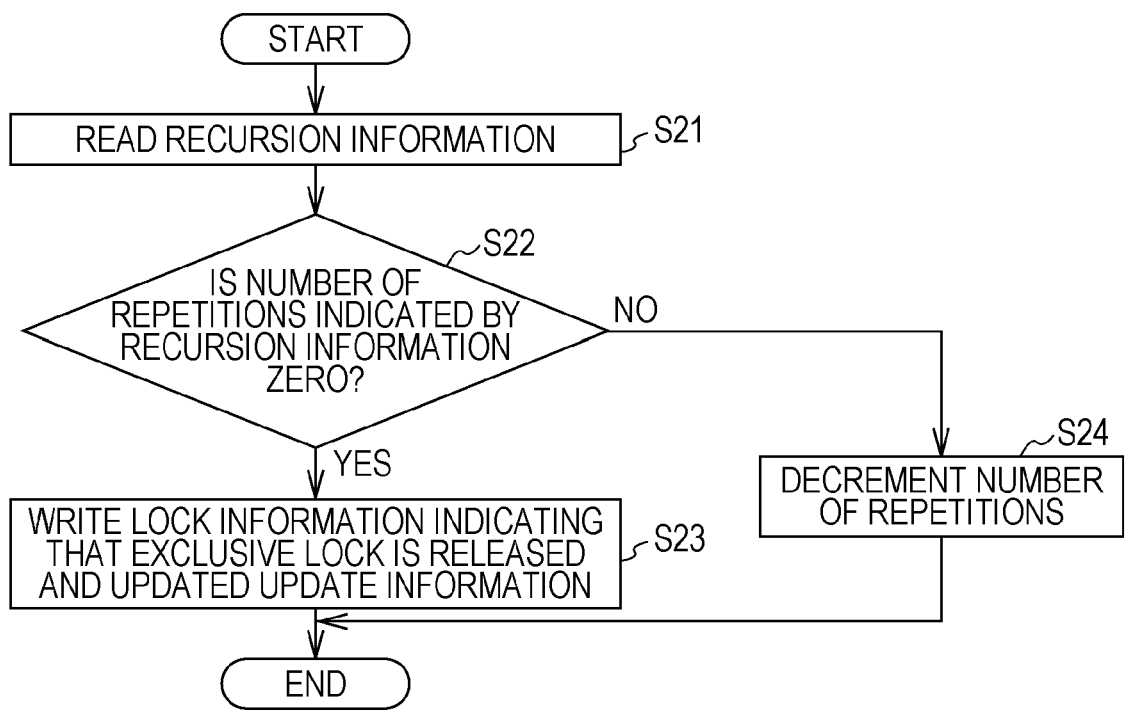
FIG. 4 shows a process flow of release of an exclusive lock by the exclusive execution unit 28 according to an embodiment of the present invention.

FIG. 4 shows a process flow of release of an exclusive lock by the exclusive execution unit 28 according to the embodiment. The exclusive execution unit 28 releases an exclusive lock and updates update information after the processing in the critical section included in the first task. When the exclusive execution unit 28 releases an exclusive lock, the exclusive execution unit 28 performs operations in steps S21 to S24 in FIG. 4.

In step S21, the exclusive execution unit 28 first reads recursion information from the lock status storage unit 26. Subsequently, in step S22, the exclusive execution unit 28 determines whether the number of repetitions indicated by the read recursion information is zero.

As a result of the determination in step S22, when the number of repetitions in the recursion information is zero (Yes in S22), the exclusive execution unit 28 causes the process to proceed to step S23. In step S23, the exclusive execution unit 28 writes, to the lock status storage unit 26, lock information indicating that an exclusive lock is released.

At the same time, the exclusive execution unit 28 reads, from the local storage area, the update information read at the time of acquisition of an exclusive lock and writes, to the lock status storage unit 26, new update information obtained by updating the read update information. For example, the exclusive execution unit 28 increments the update information stored in the local storage area and writes the update information to the lock status storage unit 26. After the exclusive execution unit 28 completes the operation in step S23, the exclusive execution unit 28 completes release of an exclusive lock and causes the first task execution unit 22 to perform processing in the first task following the critical section.

Moreover, as a result of the determination in step S22, when the number of repetitions in the recursion information is not zero (No in S22), the exclusive execution unit 28 causes the process to proceed to step S24. In step S24, the exclusive execution unit 28 decrements the number of repetitions in the recursion information stored in the lock status storage unit 26, maintaining the lock information and the task identification information stored in the lock status storage unit 26.

After the exclusive execution unit 28 completes the operation in step S24, the exclusive execution unit 28 completes release of an exclusive lock and causes the first task execution unit 22 to perform processing following the critical section, i.e., processing in the critical section outside a nest. In the aforementioned process, the exclusive execution unit 28 can release an exclusive lock after causing the critical section in the first task to be exclusively performed.

The exclusive execution unit 28 performs processing in a critical section containing code affecting execution of the other task (for example, writing to a shared variable) by acquiring an exclusive lock, as shown in the flows in FIGS. 3 and 4. Thus, in the computer system 10, processing in a critical section can be performed, with consistency between a corresponding task and the other task being maintained.

Moreover, the exclusive execution unit 28 updates update information when releasing an exclusive lock. Thus, even when another task performs processing in a critical section, omitting acquisition of an exclusive lock, the exclusive execution unit 28 can change the value of update information over the processing in the critical section. Thus, the exclusive execution unit 28 can cause the other task to re-perform the processing in the critical section. Thus, in the computer system 10, processing in a critical section can be performed, with consistency between a corresponding task and another task performing processing in a critical section without acquisition of an exclusive lock being maintained.

Moreover, the exclusive execution unit 28 writes, to the lock status storage unit 26, task identification information for identifying a corresponding task when acquiring an exclusive lock. Thus, the exclusive execution unit 28 can confirm that the exclusive execution unit 28 has acquired an exclusive lock. In this arrangement, in the computer system 10, processing nested inside a critical section can be recursively performed, with the status of acquisition of an exclusive lock being maintained.

Moreover, the exclusive execution unit 28 writes, to the lock status storage unit 26, the number of repetitions indicating the depth of a nest in a critical section. Thus, in the computer system 10, when a nested critical section is recursively performed, after the outermost operation in the critical section is completed, an exclusive lock can be reliably released.

Figure 5:
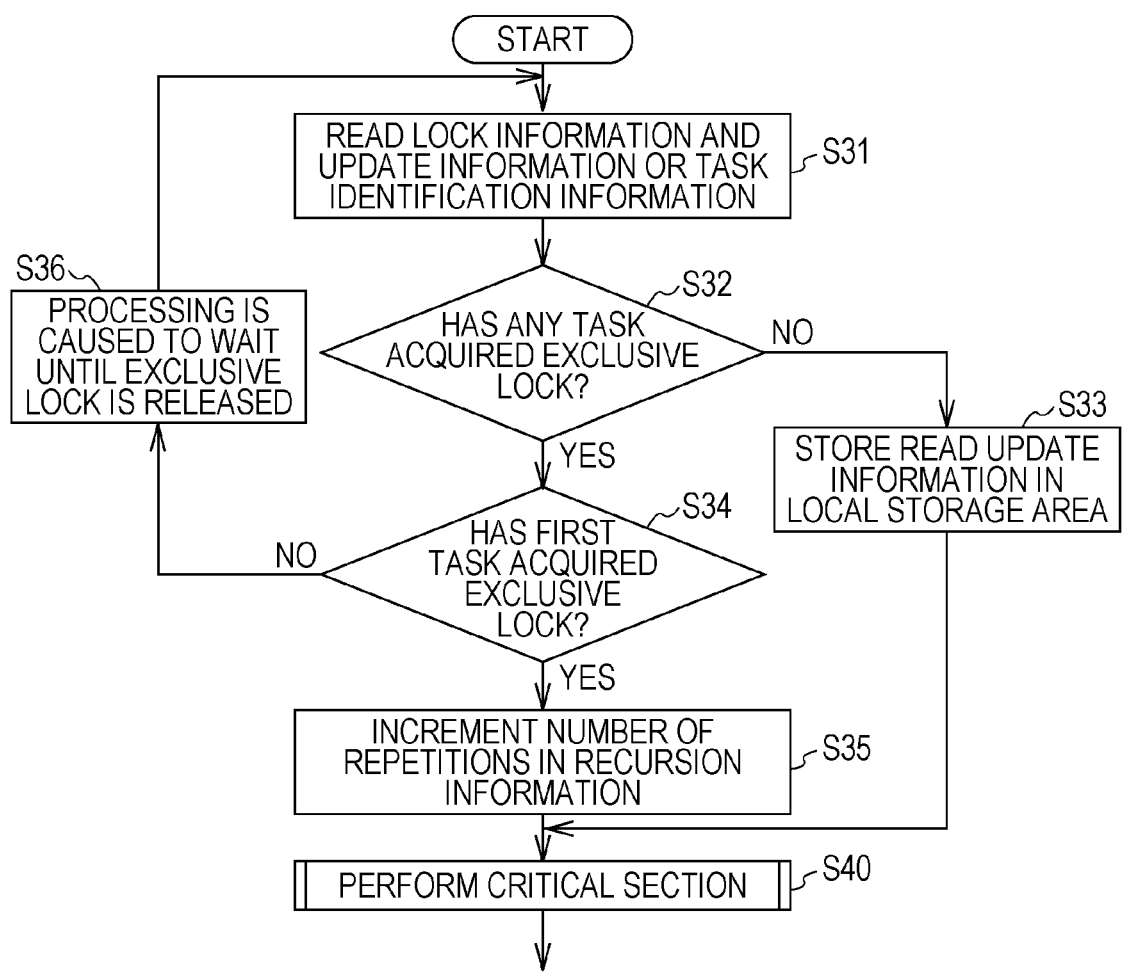
FIG. 5 shows a process flow of a critical section by a nonexclusive execution unit 30 according to an embodiment of the present invention, acquisition of an exclusive lock being omitted from the critical section.
Figure 6:
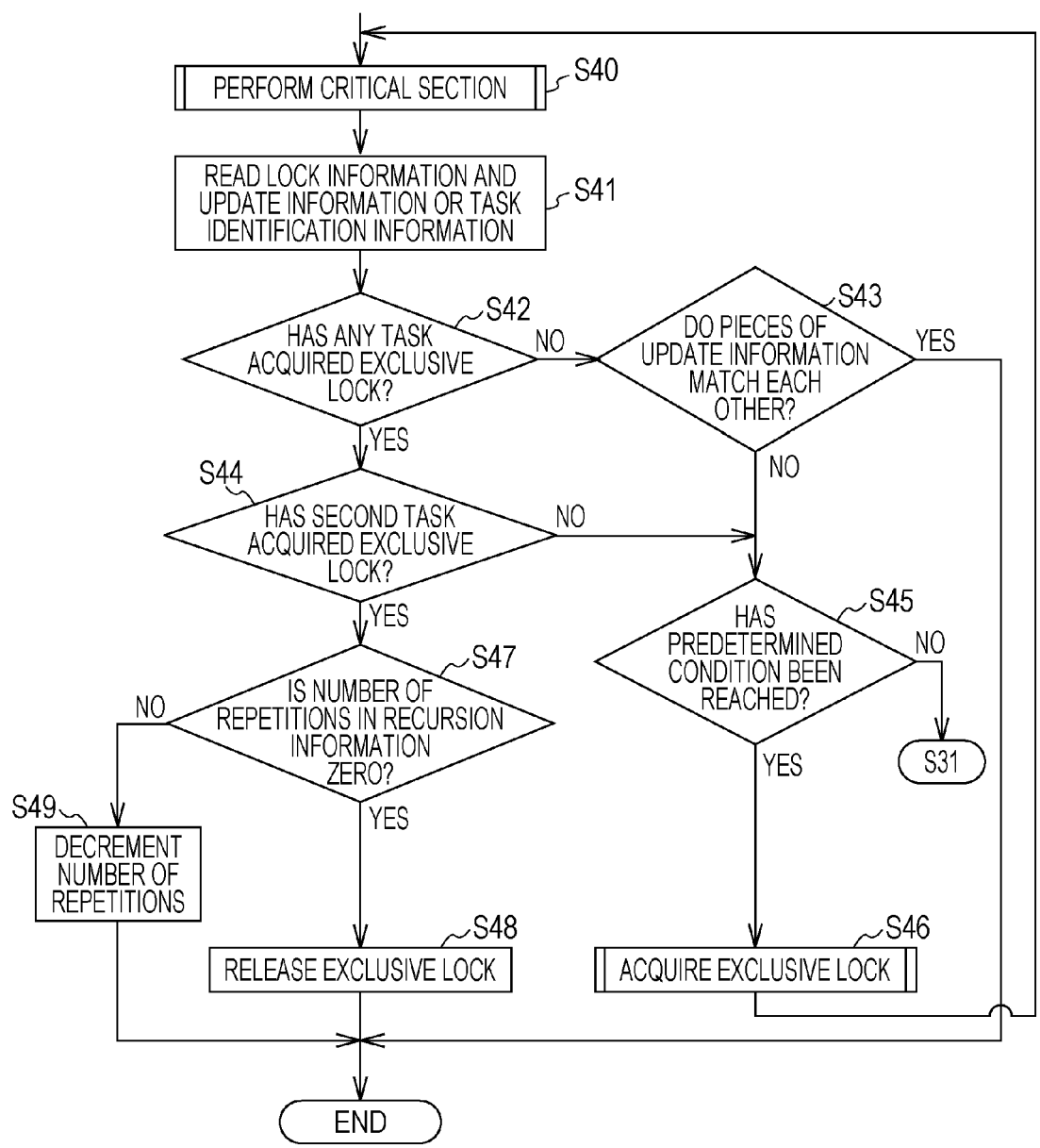
FIG. 6 shows a process flows following FIG. 5.

FIGS. 5 and 6 show a process flow of a critical section by the nonexclusive execution unit 30 according to the embodiment, acquisition of an exclusive lock being omitted from the critical section. When processing in a critical section included in the second task is performed, the nonexclusive execution unit 30 performs operations in steps S31 to S48 in FIGS. 5 and 6.

In step S31 in FIG. 5, the nonexclusive execution unit 30 first reads lock information from the lock status storage unit 26. In step S31, the nonexclusive execution unit 30 further reads update information or task identification information from the predetermined storage area of the lock status storage unit 26.

Subsequently, in step S32, the nonexclusive execution unit 30 determines whether any task has acquired an exclusive lock, referring to the read lock information. As a result of the determination in step S32, when all the tasks have released an exclusive lock (No in S32), the nonexclusive execution unit 30 causes the process to proceed to step S33. In step S33, the nonexclusive execution unit 30 stores the update information read in step S31 in the local storage area. After the nonexclusive execution unit 30 completes the operation in step S33, the nonexclusive execution unit 30 causes the process to proceed to step S40.

Moreover, as a result of the determination in step S32, when one task has acquired an exclusive lock (Yes in S32), the nonexclusive execution unit 30 causes the process to proceed to step S34. In step S34, the nonexclusive execution unit 30 determines whether the first task has acquired an exclusive lock, referring to the read task identification information. For example, the nonexclusive execution unit 30 determines whether the read task identification information matches the identification information of the first task.

As a result of the determination in step S34, when the first task has acquired an exclusive lock, i.e., when the read task identification information matches the identification information of the first task (Yes in S34), the nonexclusive execution unit 30 causes the process to proceed to step S35. In step S35, the nonexclusive execution unit 30 increments the number of repetitions in recursion information stored in the lock status storage unit 26. After the nonexclusive execution unit 30 completes the operation in step S35, the nonexclusive execution unit 30 causes the process to proceed to step S40.

Moreover, as a result of the determination in step S34, when the nonexclusive execution unit 30 determines that the first task has not acquired an exclusive lock (No in S34), the nonexclusive execution unit 30 causes the process to proceed to step S36. In step S36, the nonexclusive execution unit 30 causes the process to wait until an exclusive lock is released. When an exclusive lock is released, the nonexclusive execution unit 30 causes the process to return to step S31 and repeats the process from reading of lock information and the like.

Subsequently, in step S40, the nonexclusive execution unit 30 causes the second task execution unit 24 to perform the processing in the critical section in the second task. After the second task execution unit 24 completes the processing in the critical section in the second task (the operation in step S40 is completed), the nonexclusive execution unit 30 causes the process to proceed to step S41 in FIG. 6.

In step S41 in FIG. 6, the nonexclusive execution unit 30 reads lock information from the lock status storage unit 26. In step S41, the nonexclusive execution unit 30 further reads update information or task identification information from the predetermined storage area of the lock status storage unit 26.

Subsequently, in step S42, the nonexclusive execution unit 30 determines whether any task has acquired an exclusive lock, referring to the read lock information. As a result of the determination in step S42, when all the tasks have released an exclusive lock (No in S42), the nonexclusive execution unit 30 causes the process to proceed to step S43.

In step S43, the nonexclusive execution unit 30 determines whether the update information stored in the local storage area (the update information read in step S31) matches the update information read in step S41. That is, in step S43, the nonexclusive execution unit 30 determines whether the update information stored in the lock status storage unit 26 has changed over the processing in the critical section included in the second task.

As a result of the determination in step S43, when the pieces of update information match each other (Yes in S43), the nonexclusive execution unit 30 completes the processing in the critical section included in the second task. That is, when the update information stored in the lock status storage unit 26 has not changed over the processing in the critical section included in the second task, the nonexclusive execution unit 30 completes the processing in the critical section included in the second task.

Thus, the nonexclusive execution unit 30 can cause the processing in the critical section included in the second task to be performed, without acquiring an exclusive lock. Then, on the condition that lock information indicating that an exclusive lock is released is stored in the lock status storage unit 26 before and after the processing in the critical section included in the second task, and the update information has not changed over the processing, the nonexclusive execution unit 30 can determine that the processing in the critical section has been successfully completed.

Moreover, as a result of the determination in step S42, when one task has acquired an exclusive lock (Yes in S42), the nonexclusive execution unit 30 causes the process to proceed to step S44. In step S44, the nonexclusive execution unit 30 determines whether the second task has acquired an exclusive lock, referring to the task identification information read in step S41. For example, the nonexclusive execution unit 30 determines whether the read task identification information matches the identification information of the second task.

As a result of the determination in step S44, when the second task has not acquired an exclusive lock, i.e., when the read task identification information does not match the identification information of the second task (No in S44), the nonexclusive execution unit 30 causes the process to proceed to step S45. Moreover, as a result of the determination in step S43, when the pieces of update information do not match each other (No in S43), the nonexclusive execution unit 30 causes the process to proceed to step S45.

In step S45, the nonexclusive execution unit 30 determines whether the processing in the critical section by the second task has not been successfully completed even when a predetermined condition has been reached. For example, the nonexclusive execution unit 30 determines whether the processing in the critical section included in the second task has not been successfully completed even when the processing has been repeated predetermined times or more. Moreover, for example, the nonexclusive execution unit 30 may determine whether the processing in the critical section included in the second task has not been successfully completed after predetermined time has elapsed since the start of the processing.

As a result of the determination in step S45, in a case where the processing in the critical section by the second task has not reached the predetermined condition (No in step S45), the nonexclusive execution unit 30 causes the process to return to step S31 in FIG. 5 and repeats the process from reading of lock information and the like.

Thus, after the processing in the critical section included in the second task is performed without acquiring an exclusive lock, when one task has acquired an exclusive lock and when the processing in the critical section by the second task has not reached the predetermined condition, the nonexclusive execution unit 30 can cause the processing in the critical section to be re-performed. Thus, until all the tasks are executed in a state in which no exclusive lock is acquired, the nonexclusive execution unit 30 can cause the processing in the critical section included in the second task to be repeatedly performed.

Moreover, as a result of the determination in step S45, in a case where the processing in the critical section by the second task has not been successfully completed even when the predetermined condition has been reached (Yes in S45), the nonexclusive execution unit 30 causes the process to proceed to step S46. In step S46, the nonexclusive execution unit 30 acquires an exclusive lock. In step S46, the nonexclusive execution unit 30 performs operations similar to those in steps S11 to S17 shown in FIG. 3.

After the nonexclusive execution unit 30 acquires an exclusive lock (the operation in step S46 is completed), the nonexclusive execution unit 30 causes the process to proceed to step S40 and causes the second task execution unit 24 to perform the processing in the critical section in the second task. Thus, when the processing in the critical section by the second task has not been successfully completed even when the predetermined condition has been reached, the nonexclusive execution unit 30 can cause the processing in the critical section included in the second task to be performed by acquiring an exclusive lock.

Moreover, as a result of the determination in step S44, when the second task has acquired an exclusive lock, i.e., when the read task identification information matches the identification information of the second task (Yes in S44), the nonexclusive execution unit 30 causes the process to proceed to step S47. In step S47, the nonexclusive execution unit 30 reads recursion information from the lock status storage unit 26 and determines whether the number of repetitions indicated by the read recursion information is zero.

As a result of the determination in step S47, when the number of repetitions in the recursion information is zero (Yes in S47), the nonexclusive execution unit 30 causes the process to proceed to step S48. In step S48, the nonexclusive execution unit 30 releases an exclusive lock.

That is, in step S48, the nonexclusive execution unit 30 writes, to the lock status storage unit 26, lock information indicating that an exclusive lock is released. In step S48, at the same time, the nonexclusive execution unit 30 reads, from the local storage area, the update information read at the time of acquisition of an exclusive lock and writes, to the lock status storage unit 26, new update information obtained by updating the read update information. After the nonexclusive execution unit 30 completes the operation in step S48, the nonexclusive execution unit 30 completes the processing in the critical section included in the second task and causes processing in the second task following the critical section to be performed.

Moreover, as a result of the determination in step S47, when the number of repetitions in the recursion information is not zero (No in S47), the nonexclusive execution unit 30 causes the process to proceed to step S49. In step S49, the nonexclusive execution unit 30 decrements the number of repetitions in the recursion information stored in the lock status storage unit 26, maintaining the lock information and the task identification information stored in the lock status storage unit 26. After the nonexclusive execution unit 30 completes the operation in step S49, the nonexclusive execution unit 30 completes the processing in the critical section included in the second task and causes the second task execution unit 24 to perform processing following the critical section included in the second task, i.e., processing in the critical section outside a nest.

The nonexclusive execution unit 30 can cause processing in a critical section not containing code affecting execution of the other task (for example, writing to a shared variable) to be performed, omitting acquisition of an exclusive lock, as shown in the flow in FIGS. 5 and 6. Thus, in the computer system 10, processing in a critical section can be performed without executing an atomic instruction that is costly.

Moreover, the nonexclusive execution unit 30 determines whether the pieces of update information before and after the processing in the critical section match each other. When the pieces of update information do not match each other, the nonexclusive execution unit 30 re-performs the processing in the critical section. Thus, in the computer system 10, processing in a critical section can be performed, with consistency between a corresponding task and the other task being maintained.

Moreover, in a case where processing in a critical section is performed multiple times, when the processing has not been successfully completed even when the processing has been performed predetermined times or for predetermined time, the nonexclusive execution unit 30 performs the processing in the critical section by acquiring an exclusive lock. Thus, in the computer system 10, a case where writing frequently occurs in processing in a critical section by the other task and thus processing in a critical section in a corresponding task is not completed for a long time can be avoided.

Figure 7:
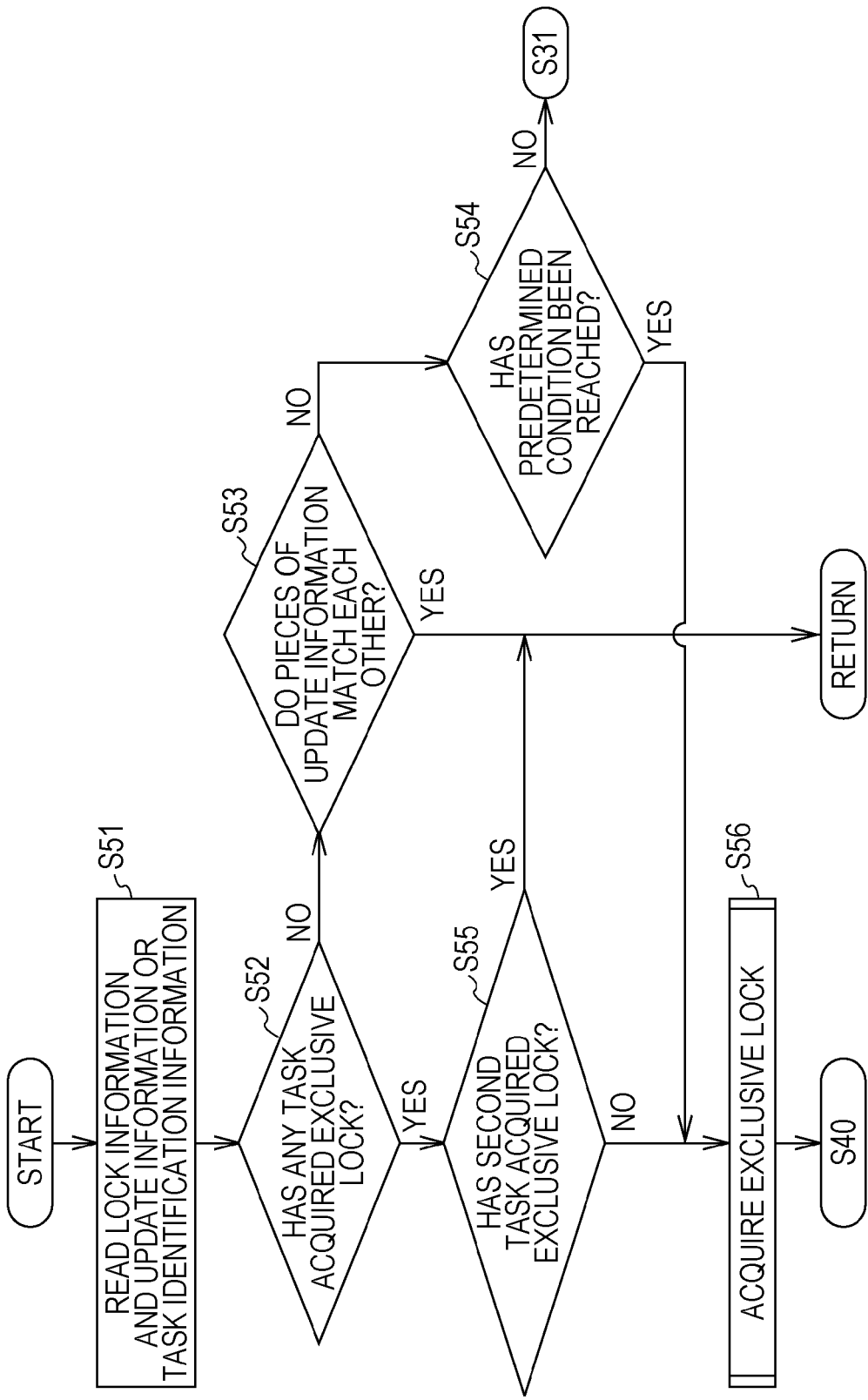
FIG. 7 shows the flow of a process performed by the nonexclusive execution unit 30 according to an embodiment of the present invention just before an address indicated by a pointer is accessed by reading the address into a register and just before branch determination in a loop in processing in a critical section performed by the nonexclusive execution unit 30 omitting acquisition of an exclusive lock.

FIG. 7 shows the flow of a process performed by the nonexclusive execution unit 30 according to the embodiment just before an address indicated by a pointer is accessed by reading the address into a register and just before branch determination in a loop in processing in a critical section performed by the nonexclusive execution unit 30 omitting acquisition of an exclusive lock.

The nonexclusive execution unit 30 performs operations in steps S51 to S56 in FIG. 7 just before an address indicated by a pointer is accessed by reading the address into a register and just before branch determination in a loop in the processing in the critical section included in the second task (the operation in step S40 in FIGS. 5 and 6).

In step S51, the nonexclusive execution unit 30 first reads lock information from the lock status storage unit 26. In step S51, the nonexclusive execution unit 30 further reads update information or task identification information from the predetermined storage area of the lock status storage unit 26.

Subsequently, in step S52, the nonexclusive execution unit 30 determines whether any task has acquired an exclusive lock, referring to the read lock information. As a result of the determination in step S52, when all the tasks have released an exclusive lock (No in S52), the nonexclusive execution unit 30 causes the process to proceed to step S53.

In step S53, the nonexclusive execution unit 30 determines whether the update information stored in the local storage area (the update information read in step S31 in FIG. 5) matches the update information read in step S51. That is, in step S53, the nonexclusive execution unit 30 determines whether the update information stored in the lock status storage unit 26 has changed from that before the processing in the critical section included in the second task.

As a result of the determination in step S53, when the pieces of update information match each other (Yes in S53), i.e., when the update information stored in the lock status storage unit 26 has not changed from that before the processing in the critical section included in the second task, the nonexclusive execution unit 30 exits from the process and causes the processing in the critical section to be continued. That is, the nonexclusive execution unit 30 causes an operation of accessing an address indicated by the pointer by reading the address into the register or an operation of branch determination in the loop to be performed.

As a result of the determination in step S53, when the pieces of update information do not match each other (No in S53), i.e., when the update information stored in the lock status storage unit 26 has changed from that before the processing in the critical section included in the second task, the nonexclusive execution unit 30 causes the process to proceed to step S54. In step S54, the nonexclusive execution unit 30 determines whether the processing in the critical section by the second task has not been successfully completed even when the predetermined condition has been reached. For example, the nonexclusive execution unit 30 determines whether the processing in the critical section included in the second task has not been successfully completed even when the processing has been repeated predetermined times or more. Moreover, for example, the nonexclusive execution unit 30 may determine whether the processing in the critical section included in the second task has not been successfully completed after predetermined time has elapsed since the start of the processing.

As a result of the determination in step S54, when the processing in the critical section by the second task has not reached the predetermined condition, the nonexclusive execution unit 30 causes the process to return to step S31 in FIG. 5 and repeats the process from reading of lock information and the like. Thus, after the processing in the critical section included in the second task is performed without acquiring an exclusive lock, when one task has acquired an exclusive lock and when the processing in the critical section by the second task has not reached the predetermined condition, the nonexclusive execution unit 30 can cause the processing in the critical section to be re-performed.

Moreover, as a result of the determination in step S52, when one task has acquired an exclusive lock (Yes in S52), the nonexclusive execution unit 30 causes the process to proceed to step S55. In step S55, the nonexclusive execution unit 30 determines whether the second task has acquired an exclusive lock, referring to the task identification information read in step S51. For example, the nonexclusive execution unit 30 determines whether the read task identification information matches the identification information of the second task.

As a result of the determination in step S55, when the second task has acquired an exclusive lock, i.e., when the read task identification information matches the identification information of the second task (Yes in S55), the nonexclusive execution unit 30 exits from the process and causes the processing in the critical section to be continued. That is, the nonexclusive execution unit 30 causes the operation of accessing an address indicated by the pointer by reading the address into the register or the operation of branch determination in the loop to be performed.

Moreover, as a result of the determination in step S55, when the second task has not acquired an exclusive lock, i.e., when the read task identification information does not match the identification information of the second task (No in S55), the nonexclusive execution unit 30 causes the process to proceed to step S56. Moreover, as a result in the determination in step S54, when the processing in the critical section by the second task has not been successfully completed even when the predetermined condition has been reached (Yes in S54), the nonexclusive execution unit 30 causes the process to proceed to step S56.

In step S56, the nonexclusive execution unit 30 acquires an exclusive lock. In step S56, the nonexclusive execution unit 30 performs operations similar to those in steps S11 to S17 shown in FIG. 3.

After the nonexclusive execution unit 30 acquires an exclusive lock (the operation in step S56 is completed), the nonexclusive execution unit 30 causes the process to proceed to step S40 shown in FIG. 6 and causes the second task execution unit 24 to perform the processing in the critical section in the second task. Thus, when the processing in the critical section by the second task has not been successfully completed even when the predetermined condition has been reached, the nonexclusive execution unit 30 can cause the processing in the critical section included in the second task to be performed from the start by acquiring an exclusive lock.

When the nonexclusive execution unit 30 causes the processing in the critical section included in the second task to be performed without acquiring an exclusive lock, in a loop process included in the processing in the critical section, the nonexclusive execution unit 30 determines whether the update information has changed from that before the processing in the critical section, as shown in the flow in FIG. 7. When the update information has changed, the nonexclusive execution unit 30 determines that the processing in the critical section included in the second task has failed. Thus, in the computer system 10, a case where, in a loop process in a critical section, as a result of execution of processing in a critical section by the other task, the loop process is not completed, resulting in an endless loop, can be avoided.

Moreover, when the nonexclusive execution unit 30 causes the processing in the critical section included in the second task to be performed without acquiring an exclusive lock, before a reference of the pointer is accessed during the processing in the critical section, the nonexclusive execution unit 30 determines whether the update information has changed from that before the processing in the critical section. When the update information has changed, the nonexclusive execution unit 30 determines that the processing in the critical section included in the second task has failed. Thus, the nonexclusive execution unit 30 can prevent a case where, when the other task writes NULL or the like to the reference of the pointer, a thread or the like accesses NULL, and execution is stopped.

In this case, when the flow shown in FIG. 7 is performed just before branch determination in a loop, the nonexclusive execution unit 30 may perform the processing, using an asynchronous event check mechanism implemented via, for example, Java (registered trademark). The asynchronous event check mechanism is performed in a method entry and the back edge of a loop. Thus, the nonexclusive execution unit 30 can perform the flow shown in FIG. 7 without overhead by using the asynchronous event check mechanism.

Figure 8:
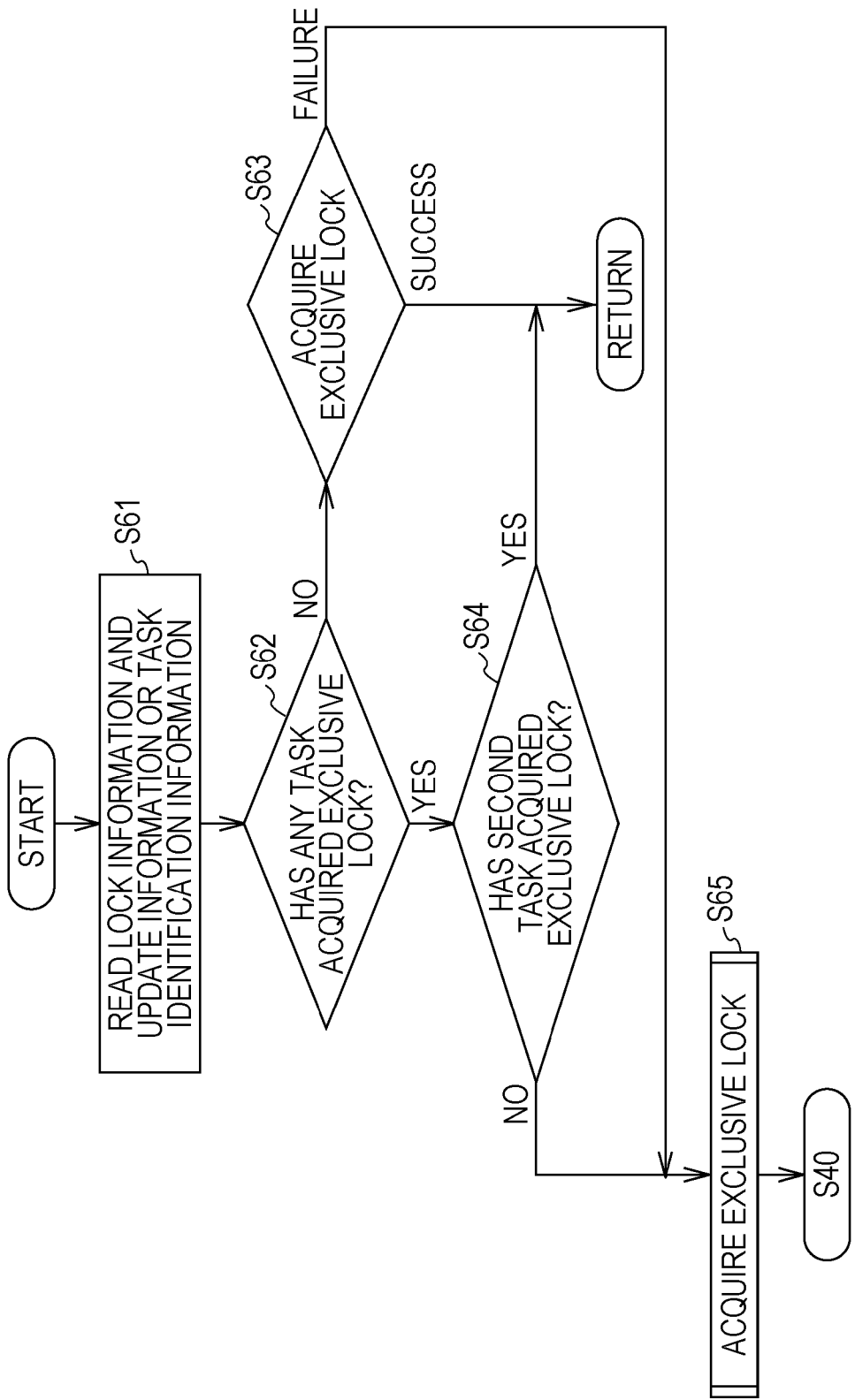
FIG. 8 shows the flow of a process performed by the nonexclusive execution unit 30 according to an embodiment of the present invention in a loop process in the processing in the critical section performed by the nonexclusive execution unit 30 omitting acquisition of an exclusive lock.

FIG. 8 shows the flow of a process performed by the nonexclusive execution unit 30 according to the embodiment in a loop process in the processing in the critical section performed by the nonexclusive execution unit 30 omitting acquisition of an exclusive lock. The computer system 10 according to the embodiment reliably performs processing in a critical section containing code affecting execution of the other task (for example, an instruction to write to a shared variable or an instruction to call a function containing an instruction to write to a shared variable) by acquiring an exclusive lock.

However, when code affecting execution of the other task comes after condition determination and is seldom executed, the corresponding critical section may be optimistically performed, omitting acquisition of an exclusive lock. In this case, the nonexclusive execution unit 30 performs operations in steps S61 to S65 in FIG. 8 after condition determination and before code affecting execution of the other task as well as the critical section according to the flows shown in FIGS. 5 to 7.

In step S61, the nonexclusive execution unit 30 first reads lock information from the lock status storage unit 26. In step S61, the nonexclusive execution unit 30 further reads update information or task identification information from the predetermined storage area of the lock status storage unit 26.

Subsequently, in step S62, the nonexclusive execution unit 30 determines whether any task has acquired an exclusive lock, referring to the read lock information. As a result of the determination in step S62, when all the tasks have released an exclusive lock (No in S62), the nonexclusive execution unit 30 causes the process to proceed to step S63.

In step S63, the nonexclusive execution unit 30 acquires an exclusive lock. That is, the nonexclusive execution unit 30 atomically writes the lock information and the task identification information to the lock status storage unit 26. When the nonexclusive execution unit 30 has successfully acquired an exclusive lock (success in S63), the nonexclusive execution unit 30 exits from the process and causes the processing in the critical section to be continued after storing the read update information in the local storage area.

Moreover, as a result of the determination in step S62, when one task has acquired an exclusive lock (Yes in S62), the nonexclusive execution unit 30 causes the process to proceed to step S64. In step S64, the nonexclusive execution unit 30 determines whether the second task has acquired an exclusive lock, referring to the task identification information read in step S61. For example, the nonexclusive execution unit 30 determines whether the read task identification information matches the identification information of the second task.

As a result of the determination in step S64, when the second task has acquired an exclusive lock, i.e., when the read task identification information matches the identification information of the second task (Yes in S64), the nonexclusive execution unit 30 exits from the process and causes the processing in the critical section to be continued.

As a result of the determination in step S64, when the second task has not acquired an exclusive lock (No in S64), the nonexclusive execution unit 30 causes the process to proceed to step S65. Moreover, when the nonexclusive execution unit 30 has failed to acquire an exclusive lock in the operation in step S63 (failure in S63), the nonexclusive execution unit 30 causes the process to proceed to step S65.

In step S65, the nonexclusive execution unit 30 acquires an exclusive lock. In step S65, the nonexclusive execution unit 30 performs operations similar to those in steps S11 to S17 shown in FIG. 3.

After the nonexclusive execution unit 30 acquires an exclusive lock (the operation in step S65 is completed), the nonexclusive execution unit 30 causes the process to proceed to step S40 shown in FIG. 6 and causes the second task execution unit 24 to perform the processing in the critical section in the second task. Thus, the nonexclusive execution unit 30 can cause the processing in the critical section included in the second task to be performed by acquiring an exclusive lock.

As a result of condition determination in the processing in the critical section included in the second task, when writing to a shared variable shared among tasks is performed, upon determining that the update information has not changed from that before the processing in the critical section, the nonexclusive execution unit 30 acquires an exclusive lock after the condition determination and before writing to the shared variable, as shown in the flow in FIG. 8. Thus, in the computer system 10, a critical section in a task in which code affecting execution of the other task is seldom executed can be performed, omitting acquisition of an exclusive lock.

In this case, when code affecting execution of the other task is contained in a loop in a critical section, the code generation unit 14 exceptionally generates control code for performing the critical section, the control code omitting acquisition of an exclusive lock. In this case, for example, when it is determined, on the basis of an execution profile, that the frequency of execution of the code is less than a reference value and when a user has specified, the code generation unit 14 may exceptionally generate control code for performing the critical section, the control code omitting acquisition of an exclusive lock.

FIG. 9 shows exemplary code described in Java (registered trademark), the code causing a memory to function as the lock status storage unit 26. In the code shown in FIG. 9, "counter" and "recursionCounter" are defined as shared variables.

In this case, "counter" is a fixed-length integer, and writing to "counter" is atomically performed. In "counter", lock information is written to the least significant bit, and update information or task identification information is written to the second least significant bit and the following higher-order bits.

Moreover, "recursionCounter" is a fixed-length integer. Recursion information is written to "recursionCounter". The computer system 10 can cause the memory to function as the lock status storage unit 26 by executing the code described in this manner.

Figure 10:
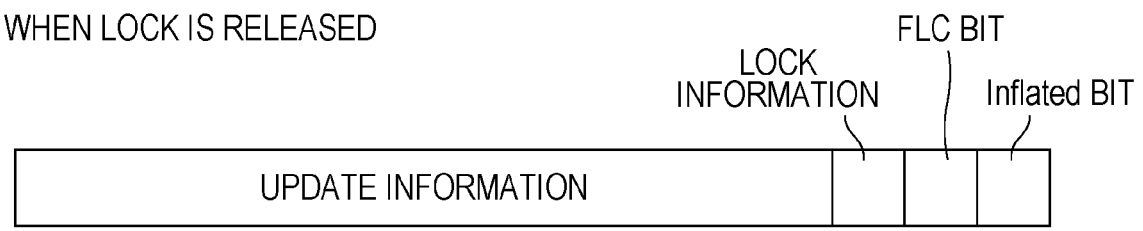
FIG. 10 shows an exemplary lock variable according to an embodiment applied to a bimodal lock when a lock has been released.
Figure 11:
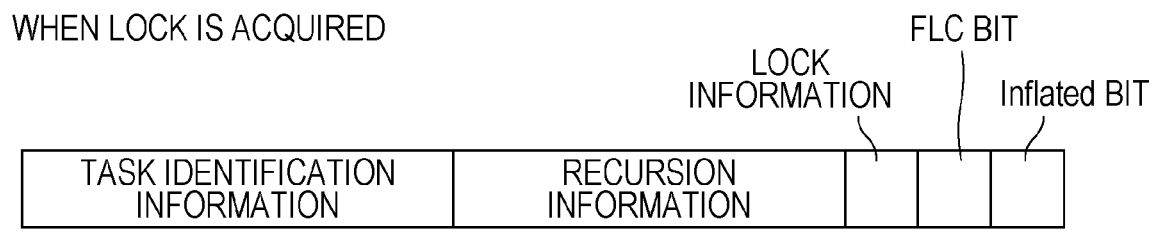
FIG. 11 shows an exemplary lock variable according to an embodiment applied to a bimodal lock when a lock has been acquired.

FIGS. 10 and 11 show exemplary structures of a lock variable implementing, together with a bimodal lock that is frequently used in Java (registered trademark) applications, the lock status storage unit 26 according to the embodiment. FIG. 10 shows the structure of the lock variable when a lock has been released. FIG. 11 shows the structure of the lock variable when a lock has been acquired.

In the lock variable in this example, the least significant bit is an Inflated bit, the second least significant bit is an FLC bit, and the third least significant bit is lock information. The Inflated bit and the FLC bit are similar to functions used in a bimodal lock. The lock information shows that an exclusive lock has been acquired when the lock information is one and shows that an exclusive lock has been released when the lock information is zero.

Moreover, in the lock variable in this example, when a lock is released, the fourth least significant to most significant bits represent update information. Moreover, in the lock variable in this example, when a lock is acquired, the fourth least significant to most significant bits are divided into two parts, the lower-order-bit-side part represents recursion information, and the higher-order-bit-side part represents task identification information.

In the computer system 10, the lock status storage unit can be implemented on the memory by carrying out such a lock variable, the lock status storage unit storing task identification information and recursion information in the predetermined storage area when an exclusive lock has been acquired and storing update information in the predetermined storage area when all tasks have released an exclusive lock. Such a lock variable preferably has a data length of, for example, one word.

When the exclusive execution unit 28 acquires an exclusive lock, using the lock variable in this example, the exclusive execution unit 28 performs the process shown in FIG. 3. In this case, when the Inflated bit is set, the exclusive execution unit 28 acquires an exclusive lock, using a monitor in the operating system. Moreover, in step S13 in FIG. 3, the exclusive execution unit 28 atomically writes, to the lock variable, a value obtained by adding four to a bit string in which recursion information and task identification information are combined.

When the exclusive execution unit 28 releases an exclusive lock, using the lock variable in this example, the exclusive execution unit 28 performs the process shown in FIG. 4. In this case, when the Inflated bit is set, the exclusive execution unit 28 releases an exclusive lock, using the monitor in the operating system.

Moreover, when the FLC bit is set, the exclusive execution unit 28 inflates an exclusive lock. In this case, the exclusive execution unit 28 stores, in a monitor variable to be used after the inflation, a value obtained by adding eight to update information stored in a local variable. When an exclusive lock is deflated, the value stored in the monitor variable is used as the initialization value of update information in the lock variable. Moreover, in the operation in step S23 in FIG. 4, the exclusive execution unit 28 writes, to the lock variable, the value obtained by adding eight to the update information stored in the local variable.

Moreover, when processing in a critical section is performed, using the lock variable in this example and omitting acquisition of an exclusive lock, the nonexclusive execution unit 30 performs the processes shown in FIGS. 5 to 8. In this case, when the Inflated bit is set, the nonexclusive execution unit 30 acquires and releases an exclusive lock, using the monitor in the operating system.

Moreover, when the FLC bit is set, in the operation in step S48 in FIG. 6, the nonexclusive execution unit 30 inflates an exclusive lock. In this case, the nonexclusive execution unit 30 stores, in a monitor variable to be used after the inflation, a value obtained by adding eight to update information stored in a local variable. In the computer system 10, the embodiment can be applied to applications in which a bimodal lock is used by performing the aforementioned operations.

Figure 12:
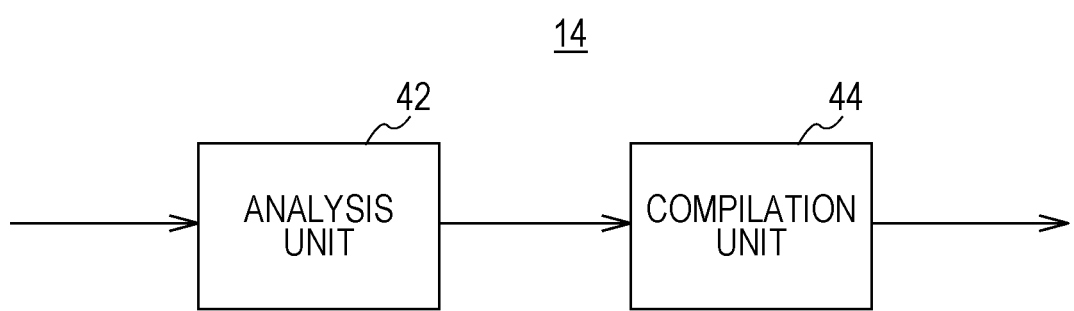
FIG. 12 shows exemplary functional components of a code generation unit 14 according to an embodiment of the present invention.

FIG. 12 shows exemplary functional components of the code generation unit 14 according to the embodiment. When the computer system 10 operates in a Java (registered trademark) environment, the code generation unit 14 is implemented via a JIT compiler. In this case, the code generation unit 14 includes an analysis unit 42 and a compilation unit 44, as shown in FIG. 12.

The analysis unit 42 analyzes a synchronized block in a method to be executed to detect a critical section containing code affecting execution of the other task. For example, the analysis unit 42 detects a critical section in a synchronized block, the critical section containing, for example, an operation of writing to a heap (an instance variable, a static variable, and an array element), an operation of calling a method containing writing to a heap, and a native method.

The compilation unit 44 generates the execution code of a method. The compilation unit 44 further generates control code for performing the flows shown in FIGS. 3 and 4, the control code corresponding to a critical section containing code affecting execution of the other task.

The compilation unit 44 further generates control code for performing the flows shown in FIGS. 5 to 7, the control code corresponding to a critical section not containing code affecting execution of the other task. Thus, control code for causing a CPU to function as the computer system 10 can be generated by the code generation unit 14.

Moreover, even in the case of a critical section containing code affecting execution of the other task, when it is determined, on the basis of an execution profile, that the frequency of execution of the code is less than a reference value, regarding the critical section, the compilation unit 44 may exceptionally generate control code for performing the flows shown in FIGS. 5 to 8.

Moreover, even when code affecting execution of the other task is not contained, exception may occur due to processing in a critical section without maintaining consistency with the other task. Thus, the code generation unit 14 specifies, as a catch block, a critical section not containing code affecting execution of the other task and generates control code for performing the operations in step S41 and the following steps in FIG. 6 when an exception has occurred in the catch block.

Thus, in the computer system 10, even in a case where an exception has occurred, when consistency is maintained among tasks, the exception is transferred directly to an application. When an exception has occurred because consistency among tasks is not maintained, the process can be re-performed from step S31 in FIG. 5. Thus, in the computer system 10, the number of interruptions of execution due to occurrence of exceptions can be reduced.

Moreover, in the computer system 10, in an execution environment based on Java (registered trademark), an exclusive lock can be omitted without rewriting source code by detecting a critical section not involving writing using a JIT compiler. However, even in the case of a critical section not involving writing, a case may occur where, since a virtual method call resides in the critical section, and a method to be called is not determined, it cannot be determined that the critical section does not involve writing.

In such a case, a user may specify a critical section not involving writing. For example, a user may specify a list including a method name and the number of lines when starting a JVM or add an annotation to a synchronized method. Thus, in the computer system 10, even in the case of a critical section in which it is difficult to detect the presence or absence of writing using a JIT compiler, the processing can be performed, omitting acquisition of an exclusive lock.

FIG. 13 shows an exemplary critical section involving writing. FIG. 14 shows an exemplary critical section not involving writing.

The computer system 10 may be implemented via a CPU in which a weak-consistency memory model is adopted. In such a case, the computer system 10 operates so as to obtain consistent execution results by executing an appropriate memory barrier.

For example, a case will now be described where the computer system 10 performs processing in the critical section shown in FIG. 13 without executing an appropriate memory barrier and performs processing in the critical section shown in FIG. 14 at the same time. In the critical section in FIG. 13, one is written to X and Y. Thus, after the processing in the critical section in FIG. 14 is performed, v1 and v2 are expected to have the same value. However, when the processing in the critical section is performed without an appropriate memory barrier, v1 and v2 may have different values.

It is first assumed that a thread T1 has performed the critical section up to the tenth line in FIG. 14. Then, it is assumed that a thread T2 has performed the critical section up to the eleventh line in FIG. 13. Then, it is assumed that the thread T1 has performed the critical section up to the twelfth line in FIG. 14. At this time, the thread T2 has not performed the twelfth line in FIG. 13 yet. Thus, the value of v1 is one, and the value of v2 is zero. In this case, at the twelfth line in FIG. 14, the value of v and a read counter value (update information) must differ from each other.

However, in a case where there is no memory barrier, when the thread T2 has performed the eleventh line in FIG. 13, completion of writing the counter value (update information) at the sixth line is not ensured. In this way, at the twelfth line in FIG. 14, the value of v and the read counter value (update information) do not necessarily differ from each other. Thus, the computer system 10 avoids inconsistent execution by executing the following memory barrier.

Before the computer system 10 performs the processing in the critical section involving writing, the computer system 10 executes a memory barrier for maintaining the order of store/load and store/store after acquiring an exclusive lock. Moreover, after the computer system 10 performs the processing in the critical section involving writing, the computer system 10 executes a memory barrier for maintaining the order of load/store and store/store before releasing the exclusive lock.

Moreover, the computer system 10 executes a memory barrier for maintaining the order of load/load after reading the update information in the processing in the critical section not involving writing. Moreover, the computer system 10 executes a memory barrier for maintaining the order of load/load before an operation in the critical section not involving writing, the operation determining whether the pieces of update information match each other.

Moreover, in Java (registered trademark), the change of the order of load and store is prohibited inside and outside a synchronized block and before and after a synchronized block. Thus, when the computer system 10 is implemented via Java (registered trademark), the computer system 10 executes a memory barrier for maintaining the order of store/load and store/store in addition to load/load after reading the update information in the processing in the critical section not involving writing.

Figure 15:
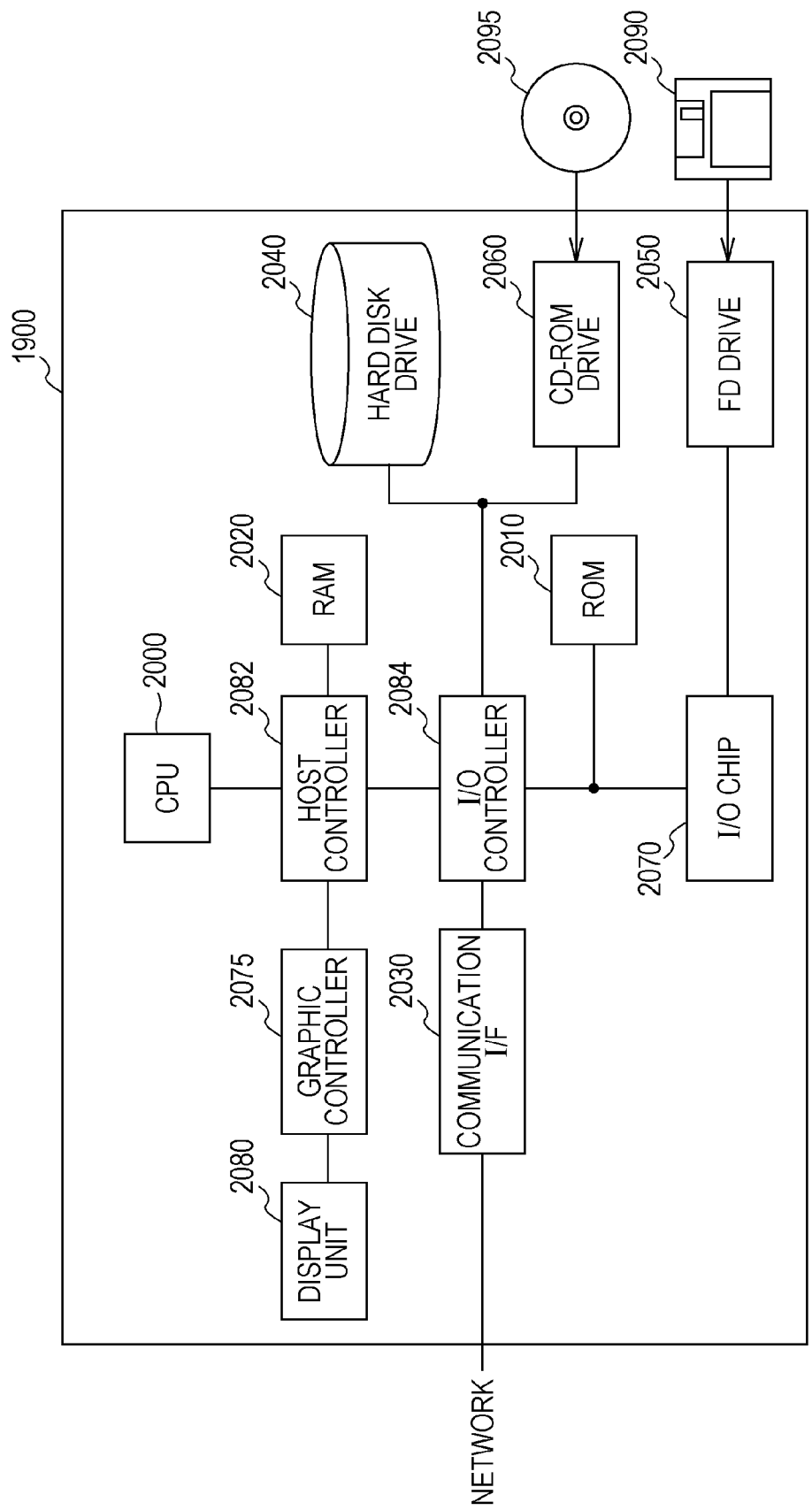
FIG. 15 shows an exemplary hardware configuration of a computer 1900 according to an embodiment of the present invention.

FIG. 15 shows an exemplary hardware configuration of a computer 1900 according to the embodiment. The computer 1900 according to the embodiment includes a CPU peripheral section that includes a CPU 2000, a RAM 2020, a graphic controller 2075, and a display unit 2080 connected to each other via a host controller 2082, an input-output section that includes a communication interface 2030, a hard disk drive 2040, and a CD-ROM drive 2060 connected to the host controller 2082 via an input-output controller 2084, and a legacy input-output section that includes a ROM 2010, a flexible disk drive 2050, and an input-output chip 2070 connected to the input-output controller 2084.

The host controller 2082 connects the RAM 2020 to the CPU 2000 and the graphic controller 2075, which access the RAM 2020 at a high transfer rate. The CPU 2000 operates on the basis of programs stored in the ROM 2010 and the RAM 2020 and controls individual components. The graphic controller 2075 obtains image data generated in a frame buffer provided in the RAM 2020 by, for example, the CPU 2000 and displays the image data on the display unit 2080. Alternatively, the graphic controller 2075 may include a frame buffer for storing image data generated by, for example, the CPU 2000.

The input-output controller 2084 connects the host controller 2082 to the communication interface 2030, the hard disk drive 2040, and the CD-ROM drive 2060, which are relatively high-speed input-output units. The communication interface 2030 communicates with another apparatus via a network. The hard disk drive 2040 stores programs and data used by the CPU 2000 in the computer 1900. The CD-ROM drive 2060 reads programs or data from a CD-ROM 2095 and supplies the programs or data to the hard disk drive 2040 via the RAM 2020.

Moreover, the ROM 2010, the flexible disk drive 2050, and the input-output chip 2070, which are relatively low-speed input-output units, are connected to the input-output controller 2084. The ROM 2010 stores a boot program that is executed when the computer 1900 is activated and/or, for example, programs that depend on the hardware of the computer 1900. The flexible disk drive 2050 reads programs or data from a flexible disk 2090 and supplies the programs or data to the hard disk drive 2040 via the RAM 2020. The input-output chip 2070 connects the flexible disk drive 2050 to the input-output controller 2084 and connects various types of input-output units to the input-output controller 2084 via, for example, a parallel port, a serial port, a keyboard port, and a mouse port.

Programs to be supplied to the hard disk drive 2040 via the RAM 2020 are stored in a recording medium, for example, the flexible disk 2090, the CD-ROM 2095, or an IC card, and supplied to users. The programs are read from the recording medium, installed in the hard disk drive 2040 in the computer 1900 via the RAM 2020, and executed in the CPU 2000.

Programs installed in the computer 1900 to cause the computer 1900 to function as the computer system 10 include a first task execution module, a second task execution module, a lock status storage module, an exclusive execution module, and a nonexclusive execution module. The programs or modules work, for example, the CPU 2000 so as to cause the computer 1900 to function as the first task execution unit 22, the second task execution unit 24, the lock status storage unit 26, the exclusive execution unit 28, and the nonexclusive execution unit 30.

The information processing described in the programs is read by the computer 1900 to function as the first task execution unit 22, the second task execution unit 24, the lock status storage unit 26, the exclusive execution unit 28, and the nonexclusive execution unit 30, which are concrete means in which software and the aforementioned various types of hardware resources cooperate with each other. Then, calculation or processing of information specific to an intended use by the computer 1900 according to the embodiment is implemented by the concrete means to construct the computer system 10 specific to the intended use.

For example, when the computer 1900 communicates with, for example, an external apparatus, the CPU 2000 executes a communication program loaded into the RAM 2020 to indicate to the communication interface 2030 to perform communication processing according to the content of processing described in the communication program. The communication interface 2030 reads, under the control of the CPU 2000, transmit data stored in, for example, a transmit buffer area provided in a storage unit, such as the RAM 2020, the hard disk drive 2040, the flexible disk 2090, or the CD-ROM 2095, and transmits the transmit data to the network. The communication interface 2030 further writes receive data received from the network to, for example, a receive buffer area provided in the storage unit. The communication interface 2030 may perform transfer of transmit and receive data from and to the storage unit by the direct memory access (DMA) method in this manner. Alternatively, the CPU 2000 may read data from the storage unit or the communication interface 2030, which is a source, and then write the data to the communication interface 2030 or the storage unit, which is a destination, so as to perform transfer of transmit and receive data.

Moreover, the CPU 2000 causes all or a necessary part of, for example, a file or a database stored in an external storage unit, such as the hard disk drive 2040, the CD-ROM drive 2060 (the CD-ROM 2095), or the flexible disk drive 2050 (the flexible disk 2090), to be read into the RAM 2020 by, for example, DMA transfer. Then, the CPU 2000 performs various types of processing on the data in the RAM 2020. Then, the CPU 2000 writes the data having been processed back to the external storage unit by, for example, DMA transfer. In such processing, since the RAM 2020 can be considered to temporarily store the content in the external storage unit, in the embodiment, the RAM 2020, the external storage unit, and the like are collectively called, for example, a memory, a storage, or a storage unit. Various types of programs and various types of information such as data, tables, and a database in the embodiment are stored in such a storage unit and subjected to information processing. In this case, the CPU 2000 may store a part of data in the RAM 2020 in a cache memory and perform read and write operations on the cache memory. Even in such a case, since the cache memory undertakes some of the functions of the RAM 2020, in the embodiment, it is assumed that the cache memory is included in the RAM 2020, a memory, and/or a storage unit, except where distinguished.

Moreover, the CPU 2000 performs, on data read from the RAM 2020, various types of processing specified by a string of instructions in a program, the various types of processing including, for example, various types of calculation, processing of information, condition determination, and retrieval and replacement of information described in the embodiment. Then, the CPU 2000 writes the processed data back to the RAM 2020. For example, when the CPU 2000 performs condition determination, the CPU 2000 compares each of the various types of variables shown in the embodiment with another variable or a constant and determines whether a condition is satisfied. The condition can be: (i) the variable is more than the other variable or the constant, (ii) the variable is less than the other variable or the constant, (iii) the variable is equal to or more than the other variable or the constant, (iv) the variable is equal to or less than the other variable or the constant, and (v) the variable is equal to the other variable or the constant. When the condition is satisfied (or not satisfied), the process branches to a different string of instructions, or a subroutine is called.

Moreover, the CPU 2000 can search for information stored in, for example, a file or a database in a storage unit. For example, when a plurality of entries in each of which the attribute value of a first attribute is associated with the attribute value of a second attribute are stored in a storage unit, the CPU 2000 can obtain the attribute value of the second attribute associated with the attribute value of the first attribute that satisfies a predetermined condition by searching for an entry in which the attribute value of the first attribute satisfies the predetermined condition in the plurality of entries stored in the storage unit and reading the attribute value of the second attribute stored in the entry.

The programs or modules, which have been described, may be stored in an external recording medium. Other than the flexible disk 2090 and the CD-ROM 2095, for example, an optical recording medium such as a DVD or a CD, a magneto-optical recording medium such as an MO, a tape medium, or a semiconductor memory such as an IC card may be used as a recording medium. Moreover, a storage unit, such as a hard disk or a RAM, provided in a server system connected to a private communication network or the Internet may be used as a recording medium, and the programs may be supplied to the computer 1900 via the network.

While the present invention has been described using the embodiment, the technical scope of the present invention is not limited to the description of the aforementioned embodiment. It is obvious to persons skilled in the art that various changes or improvements can be made in the aforementioned embodiment. It is obvious from the description of the claims that the embodiment, in which such changes or improvements are made, is also covered by the technical scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

It should be noted that, regarding the execution sequence of processes, for example, operations, procedures, steps, and stages, in the units, the systems, the programs, and the methods described in the claims, the description, and the drawings, expression such as "before" and "preceding" is not explicitly given, and the units, the systems, the programs, and the methods can be implemented with any sequence of processes unless the output of a preceding process is used by a following process.

Even when operation flows in the claims, the description, and the drawings are described using expression such as "first" and "next" for the sake of simplicity, this does not mean that such sequence is required. The scope of the following claims is to be accorded the broadcast interpretation so as to encompass all such modifications and equivalent structures and functions.

The invention claimed is:

1. A system for performing exclusive control among tasks, the system comprising:
   a lock status storage unit for storing update information that is updated in response to acquisition and release of an exclusive lock by one task and for storing task identification information for identifying a task that has acquired an exclusive lock;
   an exclusive execution unit for causing processing in a critical section included in a first task to be performed by acquiring the exclusive lock, wherein the critical section included in the first task includes code which affects execution of other tasks, and the exclusive execution unit releases the exclusive lock and updates the update information that is updated in response to acquisition and release of an exclusive lock by one task after the processing in the critical section included in the first task;
   a nonexclusive execution unit for causing processing in a critical section included in a second task to be performed without acquiring an exclusive lock, wherein the critical section included in the second task does not include code which affects execution of other tasks, and the nonexclusive execution unit determines, on the condition that the update information has not changed over the processing in the critical section included in the second task, that the processing included in the second task in the corresponding critical section has been successfully completed; and
   a code generation unit configured to:
      generate execution code by dynamically converting bytecode to execution code during execution of the tasks; and
      generate control code which omits acquisition of an exclusive lock for processing in the critical section if the code which affects execution of other tasks is executed after a condition determination and the frequency of execution is less than a specified value.

2. The system according to claim 1, wherein:
the lock status storage unit further stores lock information indicating whether any task has acquired the exclusive lock; and
the exclusive execution unit (i) when acquiring the exclusive lock, reads the lock information from the lock status storage unit and writes, on the condition that all tasks have released the exclusive lock, the lock information indicating that the exclusive lock has been acquired to the lock status storage unit; and (ii) when releasing an exclusive lock, writes the lock information indicating that an exclusive lock has been released to the lock status storage unit.

3. The system according to claim 2, wherein:
when one task has acquired the exclusive lock, the lock status storage unit includes a storage area for storing the task identification information; and
when all tasks have released the exclusive lock, the lock status storage unit includes a storage area for storing the update information;
when acquiring the exclusive lock, the exclusive execution unit reads the update information from the lock status storage unit, writes the lock information indicating that the exclusive lock has been acquired to the lock status storage unit, and writes the task identification information for identifying the first task to the lock status storage unit; and
when releasing the exclusive lock, the exclusive execution unit writes the lock information indicating that the exclusive lock has been released to the lock status storage unit and writes the new update information obtained by updating the update information read in acquisition of the exclusive lock to the lock status storage unit.

4. The system according to claim 3, wherein:
the lock status storage unit stores recursion information indicating a number of repetitions of acquisition of the exclusive lock by a same task; and
the exclusive execution unit: when acquiring an exclusive lock in a case where the first task has acquired the exclusive lock, increments the number of repetitions in the recursion information stored in the lock status storage unit, and when releasing the exclusive lock, in a case where the number of repetitions in the recursion information is a number other than zero, decrements the number of repetitions in the recursion information, maintaining the lock information and the task identification information stored in the lock status storage unit.

5. The system according to claim 4, wherein:
when one task has acquired an exclusive lock, the lock status storage unit stores the task identification information and the recursion information in the storage area; and
when all tasks have released an exclusive lock, the lock status storage unit stores the update information in the storage area.

6. The system according to claim 2, wherein, if the lock information indicating that the exclusive lock has been released is stored in the lock status storage unit before and after the processing in the critical section included in the second task and the update information stored in the lock status storage unit has not changed over the processing, then the nonexclusive execution unit determines that the processing in the corresponding critical section has been successfully completed.

7. The system according to claim 1, wherein:
when the processing in the critical section included in the second task is performed without acquiring the exclusive lock, the nonexclusive execution unit determines whether in a loop process included in the processing in the corresponding critical section the update information has changed from that before the processing in the corresponding critical section; and
when the update information has changed, the nonexclusive execution unit determines that the processing in the critical section included in the second task has failed.

8. The system according to claim 1, wherein:
when the processing in the critical section included in the second task is performed without acquiring the exclusive lock, before a reference of a pointer is accessed in the processing in the corresponding critical section, the nonexclusive execution unit determines whether the update information has changed from that before the processing in the corresponding critical section; and
when the update information has changed, the nonexclusive execution unit determines that the processing in the critical section included in the second task has failed.

9. The system according to claim 8, wherein the nonexclusive execution unit determines whether the update information has changed since acquisition of a reference of a pointer in the processing in the critical section included in the second task, and when the update information has not changed, the acquired reference of the pointer is accessed.

10. A program product stored on a non-transitory computer readable storage medium which executes on a processor to cause a computer to function as the system according to claim 1.

11. The system according to claim 1, wherein the lock storage unit is configured to store task identification information, recursion information, lock information, Fuzzy Logic Control (FLC) bits, and inflated bits.

12. The system according to claim 1, wherein the code which affects execution of other tasks is included in a loop in the critical section.

13. A method for performing exclusive control among tasks, the method comprising the steps of:
implementing a lock status storage unit on a memory, the lock status storage unit stores update information that is updated in response to acquisition and release of an exclusive lock by one task and stores task identification information for identifying a task that has acquired an exclusive lock;
processing in a critical section included in a first task to be performed by acquiring an exclusive lock, wherein the critical section included in the first task includes code which affects execution of other tasks, and an exclusive execution unit releases the exclusive lock and updates the update information that is updated in response to acquisition and release of an exclusive lock by one task after the processing in the critical section included in the first task; and
processing in a critical section included in a second task to be performed without acquiring an exclusive lock, wherein the critical section included in the second task does not include code which affects execution of other tasks, and a nonexclusive execution unit determines, on the condition that the update information has not changed over the processing in the critical section included in the second task, that the processing in the corresponding critical section has been successfully completed, wherein execution code is generated by dynamically converting bytecode to execution code during execution of the tasks using a code generation unit, and wherein control code which omits acquisition of an exclusive lock for processing in the critical section is generated if the code which affects execution of other tasks is executed after a condition determination and the frequency of execution is less than a specified value.

14. The system according to claim 4, wherein the exclusive execution unit atomically writes, to a lock variable, a value obtained by adding four bits to a bit string in which recursion information and task identification information are combined.

15. The method according to claim 13, wherein the lock storage unit stores task identification information, recursion information, lock information, Fuzzy Logic Control (FLC) bits, and inflated bits.

16. The method according to claim 13, wherein the exclusive execution unit atomically writes, to a lock variable, a value obtained by adding four bits to a bit string in which recursion information and task identification information are combined.

17. The method according to claim 13, wherein the code which affects execution of other tasks is included in a loop in the critical section.

* * * * *